US005879015A

United States Patent [19]

Ramsey et al.

[11] Patent Number: 5,879,015

[45] Date of Patent: Mar. 9, 1999

[54] METHOD AND APPARATUS FOR RECEIVING MATERIAL

[76] Inventors: Michael P. Ramsey, 2401 N. Linwood Ave., Visalia, Calif. 93291; Thomas B. Eckert, 10354 College Sq., Columbia, Md. 21044

[21] Appl. No.: 927,163

[22] Filed: Sep. 11, 1997

Related U.S. Application Data

[63] Continuation of Ser. No. 869,155, Jun. 4, 1997, abandoned, which is a continuation of Ser. No. 40,296, Mar. 30, 1993, abandoned, which is a continuation-in-part of Ser. No. 833,384, Feb. 10, 1992, Pat. No. Des. 343,490.

[51] Int. Cl.[6] .......... B62B 1/14

[52] U.S. Cl. .......... 280/47.26; 220/909

[58] Field of Search .......... 280/47.26, 47.17; 220/404, 908, 909, 627, 343, 345, 523; 414/409, 408, 407, 406

[56] References Cited

U.S. PATENT DOCUMENTS

| | | | |
|---|---|---|---|
| 11,302 | 1/1854 | Deming et al. . | |
| Re. 34,929 | 5/1995 | Bingman et al. | 414/408 |
| D. 289,317 | 4/1987 | Mezey et al. | D23/24 |
| D. 302,884 | 8/1989 | Poisat | D34/35 |
| D. 323,912 | 2/1992 | Delmerico | D34/35 |
| D. 323,913 | 2/1992 | Ernsberger et al. | D34/35 |
| D. 323,914 | 2/1992 | Doxey et al. | D34/35 |
| D. 343,490 | 1/1994 | Ramsey | D34/5 |
| D. 374,530 | 10/1996 | Prout et al. | D24/10 |
| 617,523 | 1/1899 | Day . | |
| 760,434 | 5/1904 | Donohue . | |
| 1,324,389 | 12/1919 | Ekola . | |
| 1,470,254 | 10/1923 | Bishop | 280/79.2 |
| 1,494,978 | 5/1924 | Roy . | |
| 1,604,724 | 10/1926 | Self . | |
| 1,736,563 | 11/1929 | Wilmot . | |
| 1,903,526 | 4/1933 | Andrews . | |
| 2,012,602 | 8/1935 | Forrester | 83/9 |
| 2,033,123 | 3/1936 | Cowles | 92/20 |
| 2,045,691 | 6/1936 | Armstrong | 83/11 |
| 2,556,661 | 6/1951 | Rendall et al. | 220/7 |
| 2,788,135 | 4/1957 | Girotti . | |
| 2,865,572 | 12/1958 | Lannert | 241/294 |
| 2,905,364 | 9/1959 | Marraffino | 222/94 |
| 3,037,540 | 6/1962 | Bloomquist et al. | 146/123 |
| 3,057,524 | 10/1962 | Shanks . | |

(List continued on next page.)

FOREIGN PATENT DOCUMENTS

| | | | |
|---|---|---|---|
| 0121 751 A1 | 5/1984 | European Pat. Off. | A01F 29/00 |
| 0184739 | of 1985 | European Pat. Off. . | |
| 0060 966 B1 | 8/1985 | European Pat. Off. | B65F 3/00 |
| 314238 | of 1988 | European Pat. Off. . | |
| 0257442 | 2/1988 | European Pat. Off. . | |
| 388292 | 9/1990 | European Pat. Off. . | |
| 492699 | 7/1992 | European Pat. Off. . | |
| 2511660 | 2/1983 | France . | |
| 487638 | 12/1929 | Germany . | |
| 2146 653 | 3/1973 | Germany . | |
| 2455 791 | 8/1976 | Germany . | |
| 2558433 | 6/1977 | Germany . | |
| 2651416 | 5/1978 | Germany . | |
| 3403824 | 8/1985 | Germany . | |
| 3538110 A1 | 5/1986 | Germany | B65F 1/00 |
| 3524871 A1 | 1/1987 | Germany | B65F 1/08 |
| 3537546 | 4/1987 | Germany . | |
| 3636019 A1 | 4/1988 | Germany | B65F 3/14 |
| 3703 557 C1 | 8/1988 | Germany | B65F 3/00 |
| 3703557 | 8/1988 | Germany . | |
| 3629291 | 10/1988 | Germany . | |
| 3829076 | 12/1989 | Germany . | |
| 8702545 | of 1989 | Netherlands . | |
| 1151302 A | 4/1985 | U.S.S.R. | B02C 18/44 |

*Primary Examiner*—Brian L. Johnson
*Assistant Examiner*—Bridget Avery

[57] ABSTRACT

An apparatus for receiving material composed of two components, having a pair of receptacles deployed for the individual receipt of the components of the material, a housing defining separate chambers in which the components are to be stored, and means for individually moving the components received in the separate receptacles from the receptacles into their respective chambers.

36 Claims, 8 Drawing Sheets

U.S. PATENT DOCUMENTS

| | | | |
|---|---|---|---|
| 3,083,849 | 4/1963 | Mattin . | |
| 3,118,575 | 1/1964 | McCauley | 222/349 |
| 3,211,312 | 10/1965 | Miller . | |
| 3,219,227 | 11/1965 | Deisner . | |
| 3,252,600 | 5/1966 | Brisson et al. . | |
| 3,314,617 | 4/1967 | Sargood | 241/260 |
| 3,381,875 | 5/1968 | Tunick . | |
| 3,391,832 | 7/1968 | Weislehner | 222/195 |
| 3,402,848 | 9/1968 | Busey | 220/63 |
| 3,467,269 | 9/1969 | Newton | 215/6 |
| 3,516,562 | 6/1970 | Knight . | |
| 3,528,617 | 9/1970 | Trevathan | 241/92 |
| 3,615,059 | 10/1971 | Moeller | 241/224 |
| 3,643,993 | 2/1972 | Asadurian . | |
| 3,713,595 | 1/1973 | Craig et al. | 241/46 |
| 3,720,346 | 3/1973 | Cypher | 220/22 |
| 3,741,104 | 6/1973 | Kannegiesser | 99/495 |
| 3,823,633 | 7/1974 | Ross | 93/346 |
| 3,823,973 | 7/1974 | Ramer . | |
| 3,908,848 | 9/1975 | Brewer . | |
| 3,955,765 | 5/1976 | Gaitten | 241/28 |
| 3,964,716 | 6/1976 | McCorkle et al. | 241/28 |
| 4,057,156 | 11/1977 | Thompson et al. . | |
| 4,113,125 | 9/1978 | Schiller . | |
| 4,114,776 | 9/1978 | Pluss . | |
| 4,120,460 | 10/1978 | Bacher | 241/278 |
| 4,219,298 | 8/1980 | Stragier et al. | 414/409 |
| 4,239,437 | 12/1980 | Naab | 414/408 |
| 4,267,982 | 5/1981 | Hooper | 241/257 |
| 4,305,693 | 12/1981 | Naab | 414/411 |
| 4,310,279 | 1/1982 | Johnston . | |
| 4,313,707 | 2/1982 | Bingman et al. | 414/409 |
| 4,325,516 | 4/1982 | Ismar | 241/73 |
| 4,346,813 | 8/1982 | Cho et al. | 220/22 |
| 4,366,928 | 1/1983 | Hughes | 241/30 |
| 4,372,726 | 2/1983 | Lutz . | |
| 4,425,070 | 1/1984 | Howells et al. . | |
| 4,428,493 | 1/1984 | McDonough | 220/20 |
| 4,448,361 | 5/1984 | Marcy | 241/101 |
| 4,454,995 | 6/1984 | Bloomquist | 241/277 |
| 4,469,239 | 9/1984 | Gallery, IV et al. | 220/337 |
| 4,516,732 | 5/1985 | Kela et al. | 241/24 |
| 4,551,057 | 11/1985 | Naab | 414/420 |
| 4,577,773 | 3/1986 | Bitel | 220/22 |
| 4,593,816 | 6/1986 | Langenbeck | 206/425 |
| 4,593,861 | 6/1986 | Blakley et al. | 241/46 |
| 4,597,710 | 7/1986 | Kovats . | |
| 4,613,271 | 9/1986 | Naab | 414/303 |
| 4,637,306 | 1/1987 | Bricaud et al. . | |
| 4,657,192 | 4/1987 | Browning | 241/224 |
| 4,664,320 | 5/1987 | Steffens | 241/160 |
| 4,669,940 | 6/1987 | Englehardt et al. . | |
| 4,699,187 | 10/1987 | Binzen | 141/95 |
| 4,702,402 | 10/1987 | Ferri | 224/277 |
| 4,722,656 | 2/1988 | Naab | 414/303 |
| 4,722,658 | 2/1988 | Würtz et al. | 414/408 |
| 4,729,489 | 3/1988 | Papaianni | 220/23 |
| 4,767,069 | 8/1988 | Kim | 241/152 |
| 4,773,601 | 9/1988 | Urich et al. | 241/107 |
| 4,790,489 | 12/1988 | Paul | 241/101 |
| 4,817,808 | 4/1989 | Bracy | 220/20 |
| 4,824,315 | 4/1989 | Naab et al. | 414/408 |
| 4,834,253 | 5/1989 | Crine . | |
| 4,834,262 | 5/1989 | Reed . | |
| 4,840,531 | 6/1989 | Dinneen . | |
| 4,846,411 | 7/1989 | Herron et al. | 241/101 |
| 4,867,328 | 9/1989 | McCarthy | 220/221 |
| 4,874,111 | 10/1989 | Heller | 220/404 |
| 4,881,668 | 11/1989 | Kitterman et al. | 222/482 |
| 4,886,411 | 12/1989 | Pieperhoff et al. | 414/408 |
| 4,889,462 | 12/1989 | Naab et al. | 414/408 |
| 4,905,853 | 3/1990 | Strawder | 220/221 |
| 4,913,308 | 4/1990 | Culbertson | 220/404 |
| 4,936,732 | 6/1990 | Naab et al. | 414/408 |
| 4,948,323 | 8/1990 | Gasparini . | |
| 4,953,744 | 9/1990 | Koyama | 220/404 |
| 4,976,375 | 12/1990 | Quam . | |
| 4,978,018 | 12/1990 | Wood . | |
| 4,981,411 | 1/1991 | Ramsey . | |
| 4,997,135 | 3/1991 | Zehr | 241/101 |
| 5,002,450 | 3/1991 | Naab | 414/303 |
| 5,004,392 | 4/1991 | Naab | 414/21 |
| 5,007,786 | 4/1991 | Bingman . | |
| 5,015,142 | 5/1991 | Carson . | |
| 5,015,143 | 5/1991 | Carson . | |
| 5,018,929 | 5/1991 | Carson . | |
| 5,033,641 | 7/1991 | Martin | 220/909 |
| 5,035,563 | 7/1991 | Mezey . | |
| 5,035,564 | 7/1991 | Matsumoto . | |
| 5,036,999 | 8/1991 | Bitsch | 220/627 |
| 5,044,644 | 9/1991 | Duran et al. | 280/47.35 |
| 5,049,026 | 9/1991 | Bingman et al. | 414/408 |
| 5,062,759 | 11/1991 | Pieperhoff | 414/408 |
| 5,064,088 | 11/1991 | Steffes | 220/339 |
| 5,071,303 | 12/1991 | Carson . | |
| 5,071,307 | 12/1991 | Carson . | |
| 5,074,737 | 12/1991 | Pellegrini et al. . | |
| 5,085,342 | 2/1992 | Strawder . | |
| 5,088,750 | 2/1992 | Beese . | |
| 5,094,582 | 3/1992 | Molzhon . | |
| 5,098,250 | 3/1992 | Carson . | |
| 5,116,184 | 5/1992 | Pellegrini . | |
| 5,122,025 | 6/1992 | Glomski . | |
| 5,123,801 | 6/1992 | O'Daniel . | |
| 5,149,243 | 9/1992 | Naab et al. | 414/408 |
| 5,163,805 | 11/1992 | Mezey | 414/786 |
| 5,171,119 | 12/1992 | Carson | 414/408 |
| 5,201,434 | 4/1993 | DeVivo et al. | 220/315 |
| 5,205,698 | 4/1993 | Mezey | 414/406 |
| 5,230,393 | 7/1993 | Mezey | 177/139 |
| 5,244,218 | 9/1993 | Irwin, Sr. | 280/47.19 |
| 5,288,196 | 2/1994 | Horning et al. . | |
| 5,303,841 | 4/1994 | Mezey | 220/555 |
| 5,316,430 | 5/1994 | Horning et al. . | |
| 5,322,407 | 6/1994 | Reck et al. | 414/406 |
| 5,344,273 | 9/1994 | Radlien . | |
| 5,423,448 | 6/1995 | Pedigo | 220/345 |
| 5,427,496 | 6/1995 | Rutledge, Jr. et al. . | |
| 5,482,180 | 1/1996 | Smith et al. | 220/523 |
| 5,490,606 | 2/1996 | Lombardo | 220/324 |
| 5,538,158 | 7/1996 | Prout et al. | 220/771 |
| 5,582,322 | 12/1996 | Prout et al. | 220/771 |
| 5,585,419 | 12/1996 | Prout et al. | 523/221 |

METHOD AND APPARATUS FOR RECEIVING MATERIAL

This application is a continuation of application Ser. No. 08/869,155, filed Jun. 4, 1997, now abandoned which in turn is a continuation of application Ser. No. 08/040,296, filed on Mar. 30, 1993, now abandoned which in turn is a continuation-in-part of application Ser. No. 833,384, filed Feb. 10, 1992, now U.S. Pat. No. Des. 343,490, issued Jan. 18, 1994.

FIELD OF THE INVENTION

The present invention relates to a method and apparatus for receiving material and, more particularly, to such a method and apparatus which are uniquely well suited to handling materials composed of components to be segregated and discriminately employed.

DESCRIPTION OF THE PRIOR ART

Recognition of the desirability of managing and most efficiently using natural resources is a relatively recent phenomenon and results from a multitude of interrelated considerations. It is generally conceded that societal pressure for the conservation of natural resources will continue, now that there is the recognition of its importance. However, this does not, in itself, render such conservation a practical reality.

In many respects, the technologies required effectively to conserve natural resources have not existed. As a consequence, new technologies are required to enable this objective successfully to be achieved. The recognition that a host of materials can be recycled for reuse does not mean that recycling will be adopted as a widespread practice. Unless such recycling can be achieved on a scale and with an efficiency to permit it to be self supporting, such efforts are bound to fail. Furthermore, these criteria must be met at each step in the process or the entire process may fail.

One of the most troublesome segments of the recycling process is the collection, storage, transport and discharge of materials composed of components, some of which are suitable for recycling and some of which are not suitable for recycling. Normally, waste material and recyclables are intermixed to such an extent that separation may be impractical due to the cost involved. As a consequence, the public is being trained to separate designated recyclables from purely waste materials for separate collection. A plethora of systems have been developed directed to the objective of efficiently segregating, collecting, storing, transporting and consuming these materials. Since it is logical that the people who produce these materials, such as home owners and businesses, could most effectively segregate the waste materials from the recyclables, many such prior art systems incorporate such segregation as a first step in the process. This is achieved in such prior art systems, for example, through the use of separate containers for waste materials and recyclables. Other such systems have employed divided containers adapted to receive the waste materials in one compartment and recyclables in one or more additional compartments of the same container. For example, the Reed U.S. Pat. No. 4,834,262 discloses one such prior art container.

A variety of vehicles have been devised which are intended to permit waste materials and recyclables to be separately received, stored, transported and discharged. The Miller U.S. Pat. No. 3,211,312 and the Schiller U.S. Pat. No. 4,113,125 are representative to such prior art efforts. Notwithstanding recognition of the necessity for separate handling of such materials, no prior art device has been entirely satisfactory. Without recounting in detail the specific problems associated with such prior art systems, the typical problems can be itemized by category. These categories include transferring the components from the collection container, or containers, to the vehicle while maintaining the desired segregation; transferring the components from the receiving station into segregated storage areas; and discriminately discharging the components from the vehicle at different locations and at different times as may be required. The specific problems associated with each of these categories include a multiplicity of chronic difficulties such as inordinate cost, lack of adaptability, intermixing of components, jamming of equipment, slowness of operation and otherwise inadequate performance.

Therefore, it has long been known that it would be desirable to have a method and apparatus which has particular utility in receiving and handling waste materials and recyclables; which is efficiently operable in the receiving, storing, transporting and discharging of such waste materials and recyclables while maintaining segregation thereof; which are fully compatible with a wide variety of other methods and apparatuses employed in initially collecting the waste materials and recyclables and to which the waste materials and recyclables are delivered so as to be virtually universally adaptable to existing technologies as well as to those hereafter to be developed; and which otherwise are entirely suited to practical operation.

SUMMARY OF THE INVENTION

Therefore, it is an object of the present invention to provide an improved method and apparatus for receiving material.

Another object is to provide such a method and apparatus which significantly enhance societies' ability to conserve natural resources.

Another object is to provide such a method and apparatus which possess the ability to render the recycling of a multitude of materials entirely practical for universal application.

Another object is to provide such a method and apparatus which are particularly well suited to receiving, storing, transporting and discharging waste materials and recyclables, maintaining segregation thereof throughout such handling.

Another object is to provide such a method and apparatus which are particularly well adapted to the receipt and delivery of waste materials and recyclables on a scale suited to large municipal and other collection districts, providing individual collection from residences, businesses and other sites producing the materials and operable to deliver the materials to discrete municipal collection sites.

Another object is to provide such a method and apparatus which are universal in application permitting practical usage by a broad panoply of users ranging from the smallest municipalities to the largest cities.

Another object is to provide such a method and apparatus which permit existing vehicles to be retrofitted for conversion to the apparatus of the present invention thereby minimizing the costs associated with adoption thereof.

Another object is to provide such a method and apparatus in which the operative subsystems of the vehicle are compact so that the storage area available in a vehicle of a given size is maximized, while permitting application to vehicles of a wide variety of sizes and specific configurations.

Further objects and advantages are to provide improved elements and arrangements thereof in an apparatus for the purpose described which is dependable, economical, durable and fully effective in accomplishing its intended purpose.

These and other objects and advantages of the present invention are achieved, in the preferred embodiment of the apparatus of the present invention, in a vehicle adapted for earth traversing movement having a first chamber for storing a first component of the material, a second chamber for storing a second component of the material, a first receptacle for receiving the first component, a second receptacle adjacent to the first receptacle for receiving the second component and feeding assemblies individual to the first and second receptacles selectively operable to move the first and second components from their receptive first and second receptacles into their respective first and second chambers; and a container having first and second compartments for individually receiving the first and second components and adapted to be oriented in a discharge position in which the first and second compartments of the container are disposed in individual gravitionally feeding relation to the first and second receptacles of the vehicle for substantially discrete release of the first and second components into their respective first and second receptacles.

DESCRIPTION OF THE PREFERRED EMBODIMENT

Figure 1:
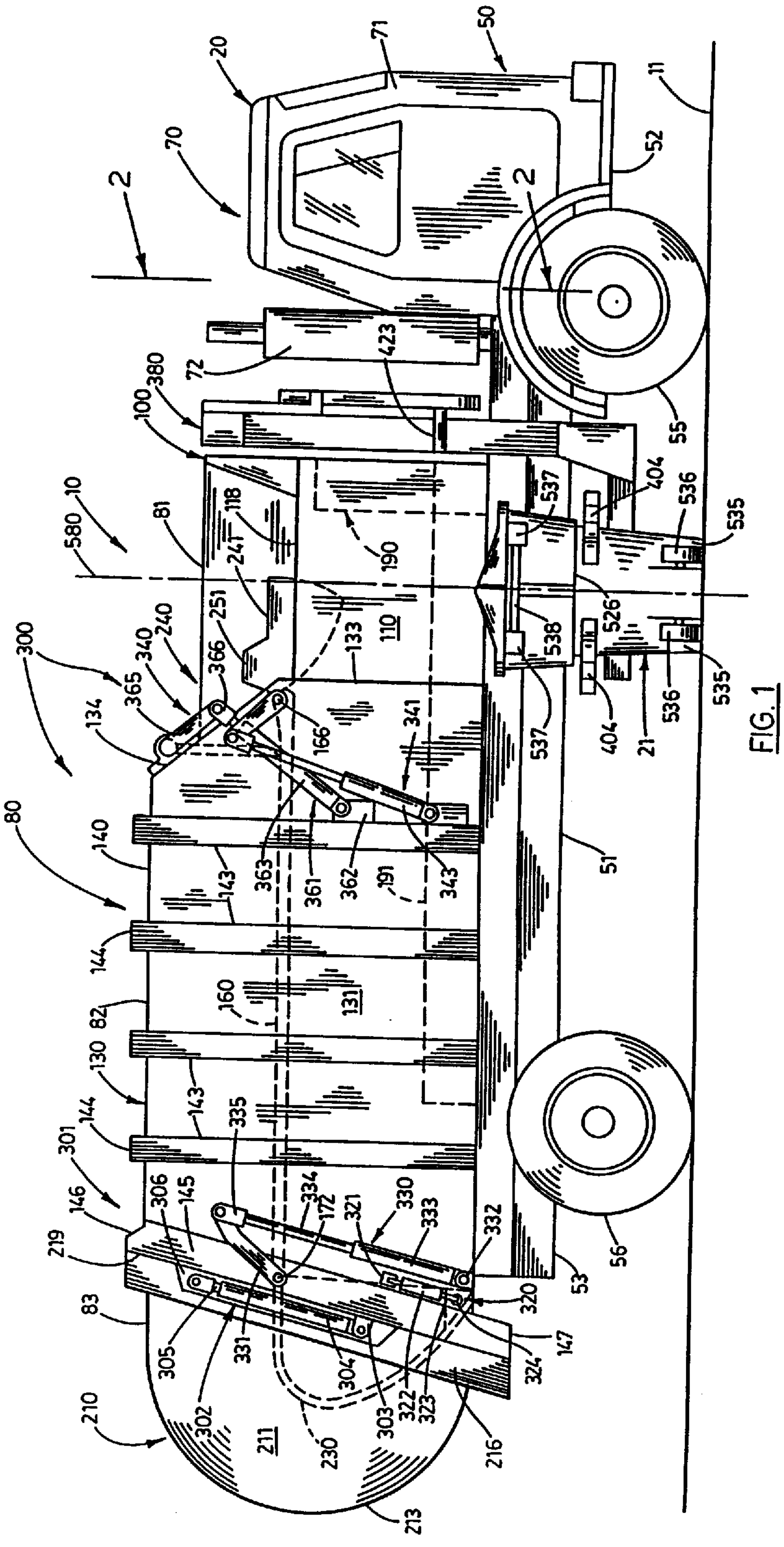
FIG. 1 is a side elevation of the apparatus of the present invention.

Referring more particularly to the drawings, the apparatus for receiving material of the present invention is generally indicated by the numeral 10 in FIG. 1. As shown therein, the apparatus is disposed on a supporting surface 11, such as a roadway. The apparatus of the present invention is composed of a vehicle 20 and a container 21.

Vehicle

It will be understood that the vehicle 20 has all of the subsystems necessary for normal operation of a vehicle of the type to be described. In the interest of clarity, only those portions of the vehicle constituting part of the subject invention, or helpful to a full understanding of the structure and operation of the invention, are described herein.

In this regard, the vehicle 20 can be viewed as including a truck 50 having a main frame 51. The truck has a front portion 52 and an opposite rear portion 53. The main frame has a pair of longitudinal frame members 54 disposed in spaced, substantially parallel relation on which are mounted front wheel assemblies 55 and rear wheel assemblies 56. Referring more particularly to FIG. 1, the vehicle has a vehicle control portion 70 including a driver's cab or compartment 71 and an engine exhaust system 72. The vehicle has a material handling portion 80, including a material receiving station 81 immediately following the control portion of the vehicle, a material storage station 82 centrally thereof and a material releasing station 83 coextensive with the rear portion 53. The material handling portion 80 of the vehicle 20 has a main housing 100. The main housing has a lower floor 101 having a front edge 102 and an opposite rear edge 103. The lower floor has parallel forward lateral extremities 104 and parallel rearward lateral extremities 105 which are laterally spaced from each other farther than are the forward lateral extremities 104.

Figure 4:
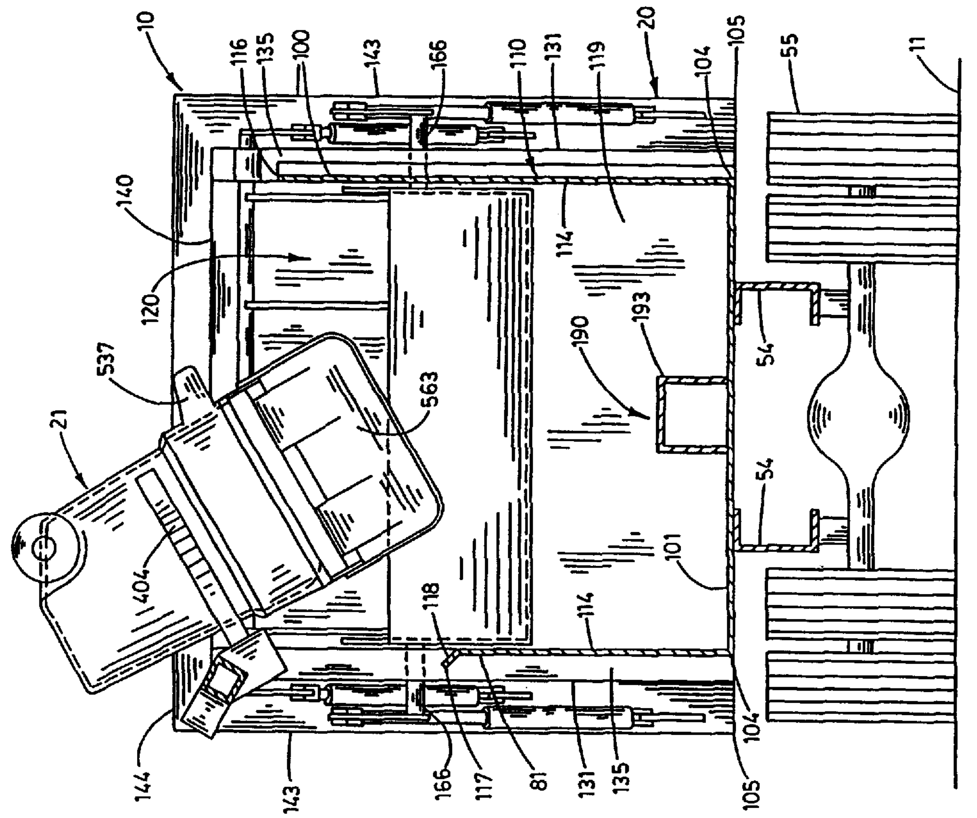
FIG. 4 is a transverse vertical section taken on line 4—4 in FIG. 2B.

The main housing 100 has a receiving box 110 mounted on and extending upwardly from the lower floor 101. The receiving box is defined by a front wall 111 extending to an upper edge 112 and having lateral edges 113. The receiving box has parallel side walls 114 extending from the lateral edges 113 of the front wall to rearward edges 115 of the side walls. The side wall on the right, as viewed in FIG. 4, extends to an upper edge 116. The side wall on the left, as viewed in FIG. 4, extends to an upper edge 117. The side wall on the left, as viewed in FIG. 4, has an outwardly extending lip or chute 118 coterminous with the upper edge 117 thereof. The front wall and side walls proscribe an interior or receiving compartment 119 for the receiving box. The receiving compartment is sometimes referred to herein as the "second receptacle." The receiving compartment communicates with the exterior thereof through a mouth or receiving opening 120.

The main housing 100 has a storage box 130 extending upwardly from the lower floor 101 and extending rearwardly of the receiving box 110. The storage box has vertical side walls 131 having front edges 132 consisting of vertical portions 133 and sloped portions 134. The front edges 132 have substantially flat forwardly facing surfaces 135 which, along the vertical portion thereof are integral with the rearward edges 115 of the side walls 114 of the receiving box 110. The side walls 131 have sloped rear edges 136.

Figure 2A:
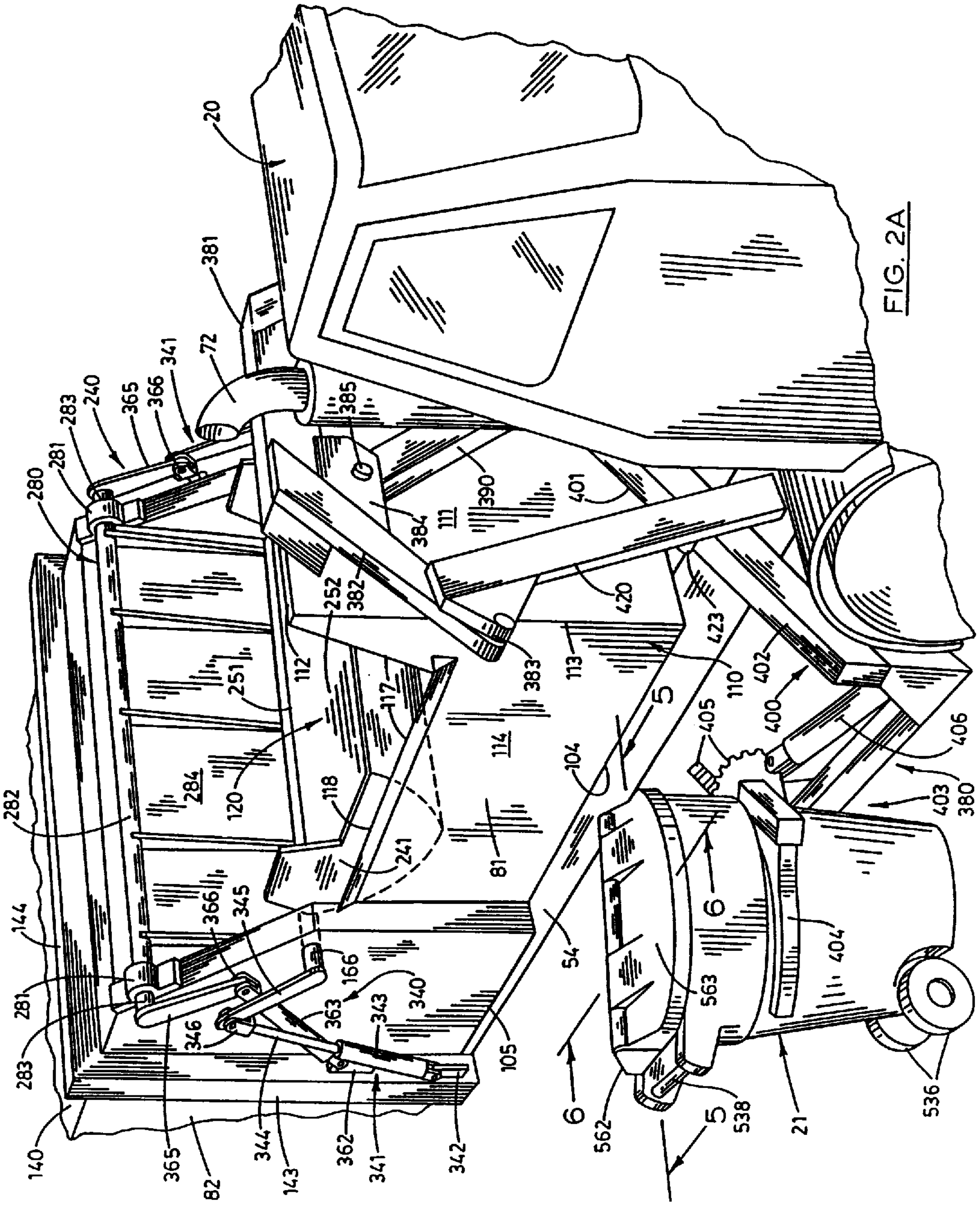
FIG. 2A is a somewhat enlarged, fragmentary perspective view of the apparatus of FIG. 1 showing the container of the present invention disposed in an initial upright attitude rested on a supporting surface at the time it is grasped by the apparatus.
Figure 2B:
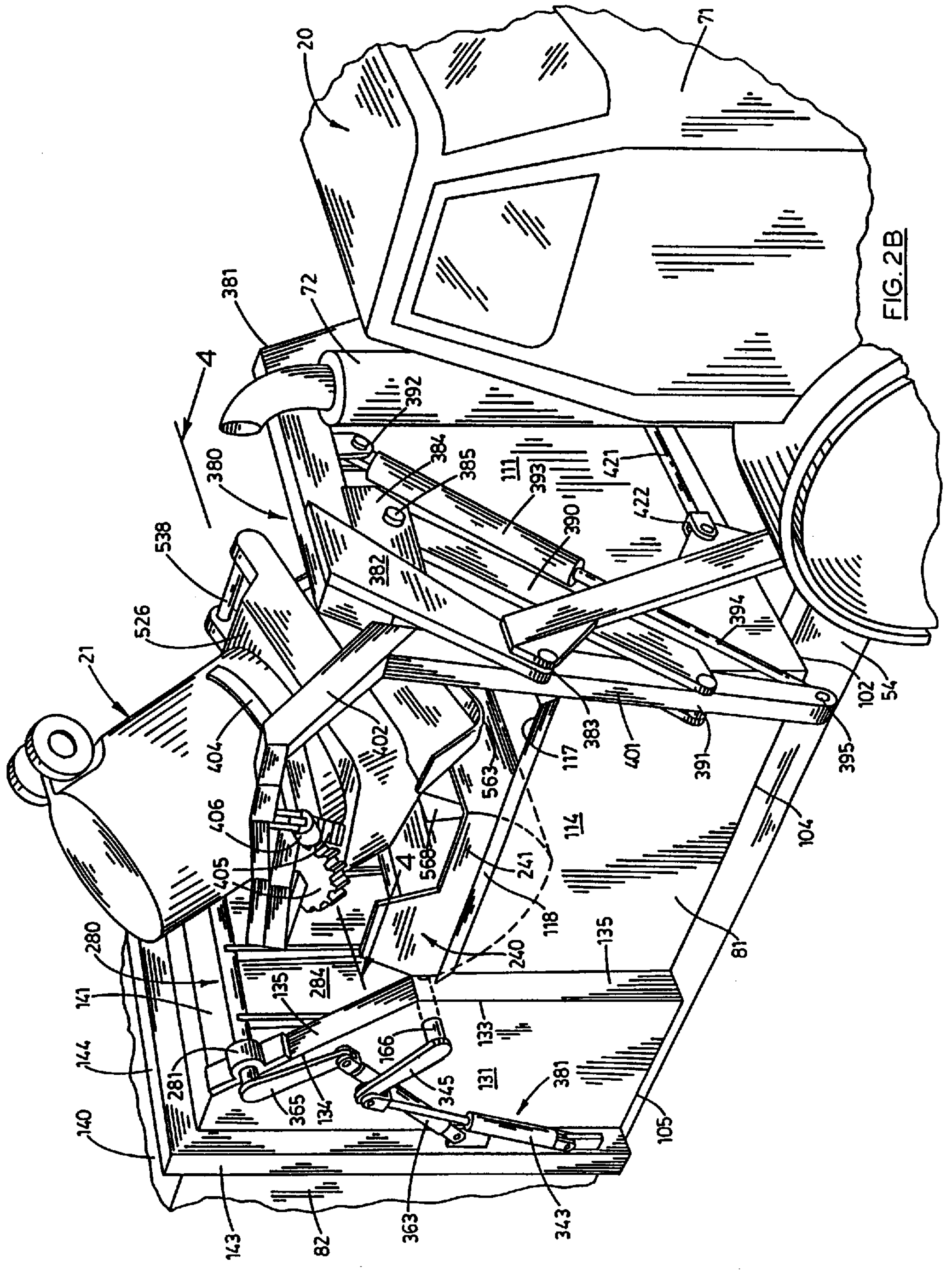
FIG. 2B is a somewhat enlarged, fragmentary perspective view of the apparatus of FIG. 1 and showing the container of the subject invention disposed in an inverted, discharge attitude.

The storage box 130 has a top wall 140 having a front edge 141 sloped in the same plane as the sloped portions 134 of the side walls 131 and best shown in FIGS. 2A and 2B. The top wall has a rear edge 142 which interconnects the upper ends of the sloped rear edges 136 of the side walls 131. To provide structural support for the storage box, a plurality of vertical support beams 143 are mounted on the exterior surfaces of the side walls in spaced substantially parallel relation to each other. Corresponding pairs of vertical support beams are interconnected by horizontal support beams 144 mounted on the exterior surface of the top wall 140. The rear vertical support beams 145 are individually mounted on the side walls 131 at the sloped rear edges 136 thereof disposed at the same sloped angles as the sloped rear edges. An upper horizontal support beam 146 interconnects the upper ends of the rear vertical support beams extending therebetween across the top wall at the rear edge 142 thereof. A lower horizontal support beam 147 interconnects the lower ends of the rear vertical support beams at the rear edge 103 of the lower floor 101.

The storage box 130 has a central floor 160 mounted on and extending between the side walls 131 thereof, as best shown in FIGS. 3A through 3E. The central floor has a front portion 161. The front portion extends rearwardly from a leading edge 162 which interconnects the side walls just rearwardly of the junctures of the vertical and sloped portions 133 and 134, respectively, of the front edges 132 of the side walls. The leading edge has a downwardly and rearwardly sloped surface 163 and an upwardly and rearwardly sloped surface 164. A shaft assembly 165 is mounted on the leading edge 162 and has opposite end portions 166 individually extending through the side walls to positions externally of the housing. The shaft assembly includes suitable bearings, not shown, mounting the shaft assembly for pivotal movement about its longitudinal axis, as will hereinafter be described in greater detail.

The central floor 160 has a rear portion 170. A shaft assembly 171 is mounted on the terminus of the rear portion of the central floor, as best shown in FIGS. 3A through 3E, and has opposite end portions 172 extending through the side walls in opposite directions to positions externally of the storage box. As with the shaft assembly 165, it will be understood that the shaft assembly includes bearings, not shown, which mount the shaft assembly for pivotal movement about its longitudinal axis, as will hereinafter be described in greater detail. The central floor has an upper surface 173 which has an upwardly curved portion 174 at the front portion 161 of the central floor. The central floor has a substantially flat lower surface 175. The area proscribed by the lower floor 101, the side walls 131 and the central floor 160 constitutes a waste material compartment or chamber 180. The area proscribed by the central floor 160, side walls 131 and top wall 140 constitute a recyclable compartment or chamber 181. The recyclable chamber is sometimes referred to herein as the "first chamber." The waste material chamber is sometimes referred to herein as the "second chamber."

As perhaps shown best in FIGS. 3A through 3E, a waste feeding assembly 190 is mounted on the lower floor 101 of the main housing 100 extending from the receiving box 110 to the forward portion of the waste material compartment 180. The waste feeding assembly has a central housing 191 composed of a hydraulic portion 192 and a track portion 193. A compression head 194, having substantially the same exterior dimensions as the interior transverse dimensions of the waste material compartment 180, is mounted on a track portion 193 for movement between the retracted position shown in FIGS. 3A and 3B and the extended position shown in FIG. 3D. The waste feeding assembly is otherwise entirely conventional and includes hydraulic and mechanical subsystems operable to perform the functions involved and hereinafter to be described.

Figure 3A:
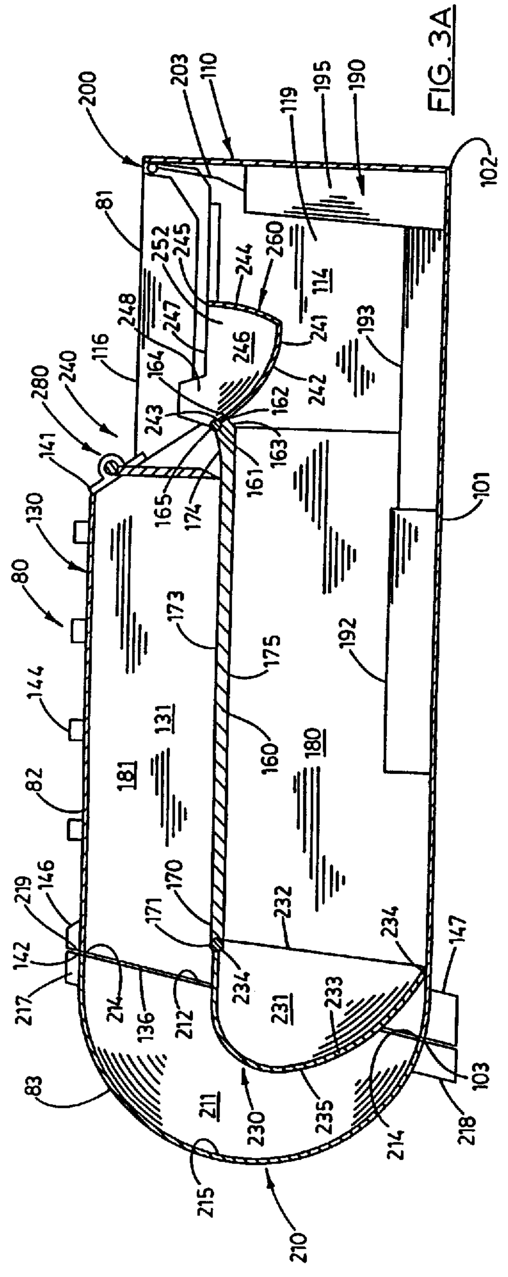
FIG. 3A is a longitudinal vertical section of a material handling portion of the apparatus and showing the recyclable receiving and handling assembly of the apparatus in a first operative attitude and the interior rear door assembly in a first or closed operative attitude.
Figure 3B:
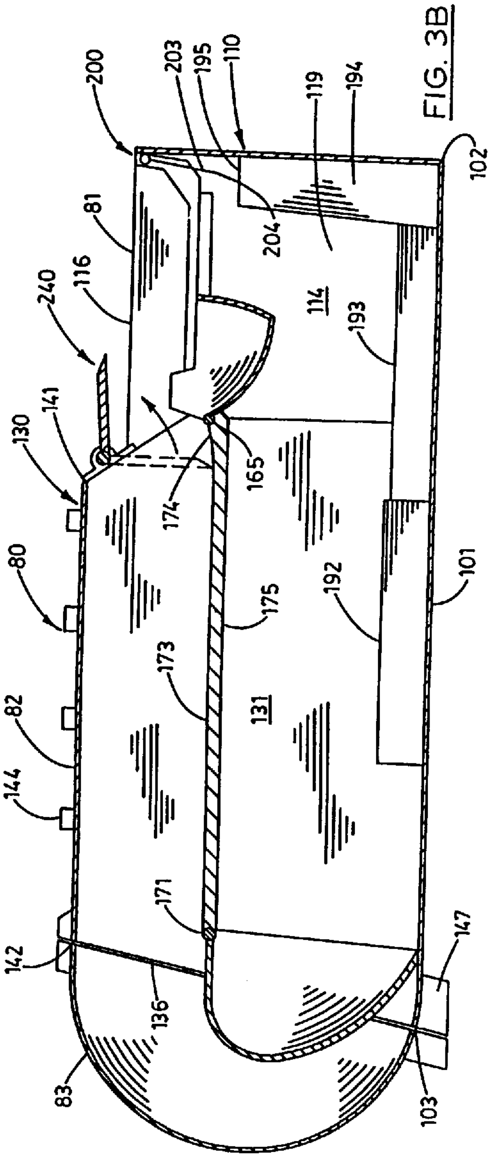
FIG. 3B is a longitudinal vertical section of the material handling portion of FIG. 3A showing the recyclable receiving and handling assembly in a second operative attitude.
Figure 3C:
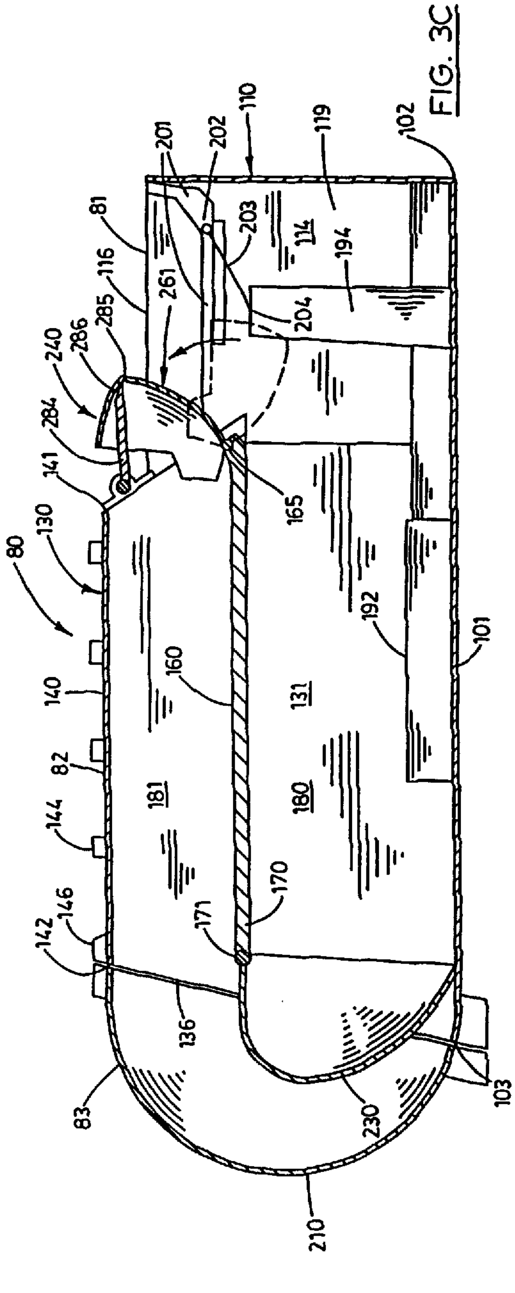
FIG. 3C is a longitudinal vertical section of the material handling portion showing the recyclable receiving and handling assembly in a third operative attitude and the waste feeding assembly in a second operative attitude.
Figure 3D:
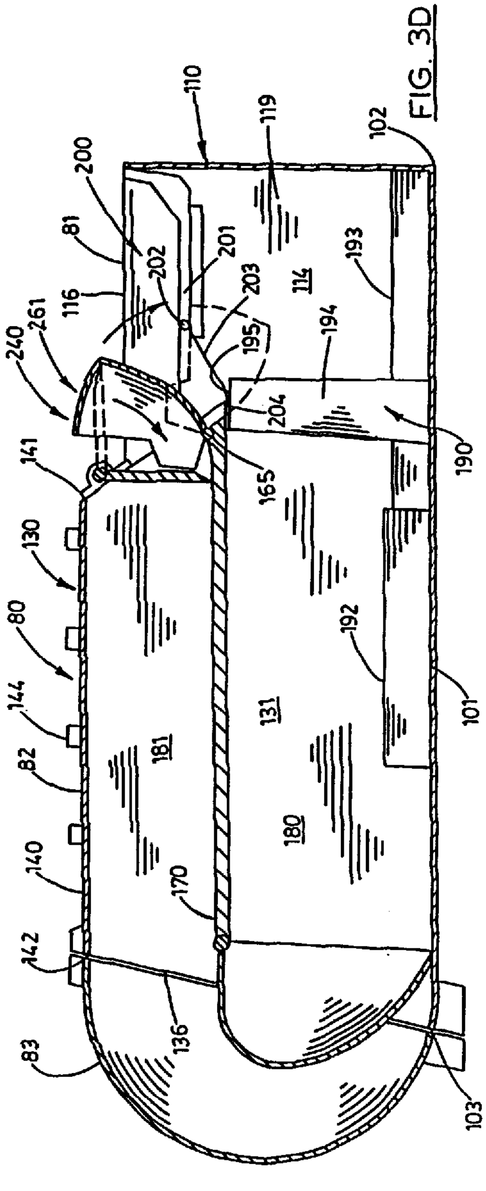
FIG. 3D is a longitudinal vertical section of the material handling portion showing the recyclable receiving and handling assembly in a fourth operative attitude and the waste feeding assembly in a third operative attitude.
Figure 3E:
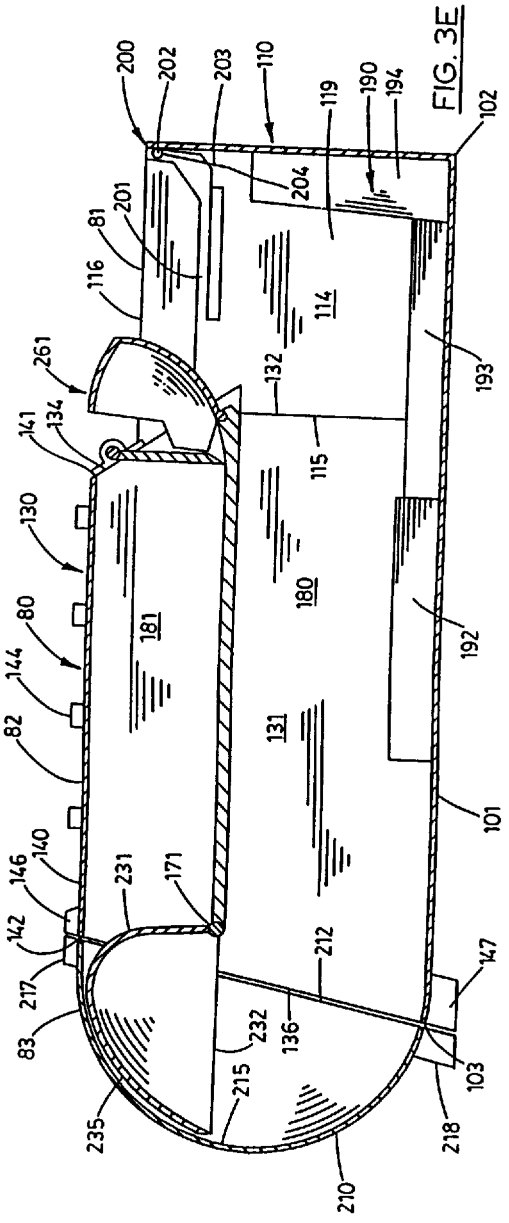
FIG. 3E is a longitudinal vertical section of the material handling portion showing the interior rear door assembly in a second opened operative attitude.

A receiving box deflecting assembly 200 is mounted within the receiving box 110 between the upper surface 195 of the compression head and the receiving opening 120 of the receiving box. The receiving box deflecting assembly includes a pair of guide tracks 201 individually provided on the interior surfaces of the side walls 114 of the receiving box and extending substantially from the mouth 120 of the receiving box immediately adjacent to the front wall 111 downwardly and then rearwardly along a path extending in the direction of the storage box 130. A following assembly 202 is mounted in and extends between the guide tracks for movement therealong. A deflection plate 203 is mounted on the following assembly extending between the side walls of the receiving box and has a distal edge 204 pivotally mounted on the upper surface 195 of the compression head 194. As can be seen upon reference to FIGS. 3A through 3E, the deflection plate 203 is caused to move between the substantially vertical position directly above the compression head 194 as shown in FIGS. 3A, 3B and 3E, and an oblique attitude as shown in FIGS. 3C and 3D.

A rear door assembly 210 is mounted on the storage box 130 at the rear of the vehicle 20, as shown on the left in FIG. 1. The rear door assembly has parallel side walls 211 having sloped forward edges 212 and an arcuate backwall 213. The arcuate backwall has horizontal, parallel, forward edges 214 and an arcuate interior surface 215. Support beams 216 are individually mounted on the side walls 211 at the sloped forward edges 212 thereof sloped for substantially facing engagement with the sloped support beams 145 of the storage box 130. An upper horizontal support beam 217 interconnects the upper ends of the vertical support beams 216. A lower horizontal support beam 218 interconnects the lower ends of the vertical support beams 216. The rear door assembly 210 is mounted in the position shown in FIG. 1 on the rear of the vehicle by a mounting assembly 219. The mounting assembly is operable to permit the rear door assembly to follow a path of travel between the closed and locked position shown in FIG. 1 and an opened position wherein the lower horizontal support beam 218 and the associated arcuate backwall 213 are pivoted away from the lower horizontal support beam 147 of the storage box so as completely to expose the interior of the storage box. The subsystems operable to achieve this operation are conventional and, accordingly, are not described herein.

An interior rear door assembly 230 is mounted on the shaft assembly 171 at the terminus of the central floor 160. The interior rear door assembly has parallel side walls 231 having forward edges 232. The side walls are interconnected by an arcuate backwall 233 having parallel forward edges 234. The arcuate backwall has an arcuate exterior surface 235 so conFig.d as to nest against the arcuate interior surface 215 of the rear door assembly when the interior rear door assembly is in the position shown in FIG. 3E.

A recyclable receiving and handling assembly 240 is mounted on the storage box 130 so as, in effect, to interconnect the receiving box 110 and the recyclable compartment 181 of the storage box. The receiving and handling assembly includes a receiving bucket 241 mounted on the shaft assembly 165 for pivotal movement therewith about its longitudinal axis. The receiving bucket has a sloped floor 242 having a trailing edge 243 which is mounted on the shaft assembly 165. The receiving bucket has a front wall 244 extending to an upper edge 245. The receiving bucket has parallel side walls 246 interconnected by the sloped floor and front wall. The side walls have upper edges 247 with extending portions 248, as perhaps best shown in FIGS. 3A through 3E. The trailing edge 243 of the sloped floor and the extended portions 248 of the side walls define a discharge chute 251 whose function will hereinafter be described in greater detail. The sloped floor, front wall and side walls define a receptacle 252 therewithin for the receiving bucket.

The receptacle 252 is sometimes referred to herein as the "first receptacle." Referring more particularly to FIGS. 3A through 3E, the receiving bucket is positionable in a lower receiving position 260 shown in FIG. 3A and an elevated discharge position 261 shown in FIGS. 3C through 3E.

The recyclable receiving and handling assembly 240 further includes a sweeping assembly 280, perhaps best shown in FIG. 2A. The sweeping assembly has bearings 281 individually mounted in corresponding positions on the sloped portions 134 of the front edges 132 of the side walls 131 of the storage box 130. The bearings are mounted in alignment to define an axis of rotation extending therethrough transversely of the storage box. A shaft 282 is rotationally received in the bearings and has opposite ends 283 extending laterally of the individual bearings. A member or sweeping wall 284 is mounted on the shaft 282 between the bearings for movement between the sidewalls 131 of the storage box between the position shown in full lines in FIG. 3A and the position shown in full lines in FIG. 3B. The sweeping wall has a terminal edge 285 parallel to the shaft 282 and a beveled surface 286.

The vehicle 20 has a hydraulic control system 300 for controlling operation of the portions of the vehicle constituting part of the apparatus 10 of the present invention. As previously noted, the hydraulic subsystems for operating the conventional portions of the vehicle are not shown herein. As suitable hydraulic or other subsystems can be employed for these purposes. One such hydraulic subsystem is operable to move the main housing 100 from the horizontal position shown in FIG. 1 to an inclined position sloping downwardly toward the rear portion 53 of the vehicle.

The hydraulic control system 300 includes a rear hydraulic control system 301. The rear hydraulic control system, in turn, can be viewed as having a rear door hydraulic control assembly 302. The rear door hydraulic control system includes hydraulic cylinder mounts 303 individually mounted on the rear vertical support beams 145 of the storage box 130 on the opposite lateral sides thereof. Hydraulic cylinders 304 are individually mounted in the hydraulic cylinder mounts 303. The hydraulic cylinders individually have hydraulic cylinder rods 305 operable in the conventional fashion under hydraulic pressure to extend and retract relative to the hydraulic cylinder. The hydraulic cylinder rods 305 are individually mounted on the vertical support beams 216 of the rear door assembly 210 by hydraulic cylinder rod mounts 306. As viewed in FIG. 1, extension of the hydraulic cylinder rods from hydraulic cylinders under control of the rear door hydraulic control system cause the rear door assembly 210 first to slide upwardly along the rear vertical support beams 145 and then, under the impetus of a conventional subsystem not shown, to pivot in a clockwise direction, as viewed in FIG. 1, to a raised position exposing the interior of the storage box. Retraction of the hydraulic cylinder rods within the hydraulic cylinders causes the rear door assembly again to be returned to the position, shown in FIG. 1, sealing the interior of the storage box.

The hydraulic control system 300 further includes an interior rear door latch assembly 320. The interior rear door latch assembly has hydraulic cylinder mounts 321 individually mounted on the side walls 131 of the storage box 130 on the opposite lateral sides thereof. Hydraulic cylinders 322 are individually mounted on the hydraulic cylinder mounts. Each of the hydraulic cylinders 322 has an hydraulic cylinder rod 323 extendable from and retractable into the hydraulic cylinder under hydraulic pressure. The hydraulic cylinder rods 323 of the respective hydraulic cylinders are mounted on hydraulic cylinder rod mounts 324 which are, in turn, attached to rear door latch mechanisms internally of the storage box. The latch mechanisms are entirely conventional and are operated by the latch assembly 320 to lock the rear door assembly 210 in the closed position, or alternatively, to operate the latch assembly to release the rear door assembly for movement between the closed position and the opened position as heretofore described.

The rear hydraulic control system 301 includes an interior rear door hydraulic control assembly 330. The interior rear door hydraulic control assembly has a pair of lever arms 331 individually mounted on the opposite end portions 172 of the shaft assembly 171. A pair of hydraulic cylinder mounts 332 are individually mounted on the side walls 131 of the storage box 130 on opposites sides of the lower floor 101. Hydraulic cylinders 333 are individually mounted on the hydraulic cylinder mounts and individually mount hydraulic cylinder rods 334 extendable from and retractable into the hydraulic cylinders under hydraulic pressure as controlled by the rear hydraulic control system 301. The hydraulic cylinder rods 334 are individually mounted on the ends of the lever arms 331 by hydraulic cylinder rod mounts 335. Thus, as can best be seen upon reference to FIG. 1, upon operation of the rear hydraulic control system, the hydraulic cylinders 333 retract the hydraulic cylinder rods 334 therewithin to pivot the lever arms in a clockwise direction, as shown in FIG. 1, and thus, pivot the interior rear door assembly 230 from the closed position shown in phantom lines in FIG. 1 and in full lines in FIGS. 3A through 3D, to the opened position shown in full lines in FIG. 3E.

The hydraulic control system 300 includes a recyclable hydraulic control assembly 340, perhaps best shown in FIGS. 2A and 2B. The recyclable hydraulic control assembly includes a receiving bucket hydraulic control assembly 341 which has a pair of hydraulic cylinder mounts 342 individually mounted on the vertical support beams 143 most closely adjacent to the receiving box 110. An hydraulic cylinder 343 is individually mounted on each of the hydraulic cylinder mounts and, in turn, has an hydraulic cylinder rod 344 extendable from and retractable therewithin under hydraulic pressure under the control of the hydraulic control system 300. A pair of lever arms 345 are individually mounted on the respective opposite end portions 166 of the shaft assembly 165. The hydraulic cylinder rods are individually connected to the outer end portions of the lever arms by hydraulic cylinder 346.

The recyclable hydraulic control assembly 340 includes a sweeping control assembly 361. The sweeping control assembly includes a pair of hydraulic cylinder mounts 362 individually mounted on the vertical support beams 143 above their respective corresponding hydraulic cylinder mounts 342. A pair of hydraulic cylinders 363 are individually mounted on the hydraulic cylinder mounts 362 and, in turn, mount hydraulic cylinder rods 364 individually extendable from and retractable within the hydraulic cylinders under the impetus of hydraulic pressure as controlled by the hydraulic control system 300. A pair of level arms 365 are individually mounted on the opposite ends 283 of the shaft 282. The ends of the hydraulic cylinder rods 364 are individually connected to the outer end portions of the lever arms 365 by hydraulic cylinder rod mounts 366. As can, perhaps, best be visualized in FIGS. 2A and 2B, when the receiving bucket 241 is in the lower receiving position 260, retraction of the hydraulic cylinder rods 344 causes the lever arms 345 to be pivoted in a counterclockwise direction as viewed in FIGS. 2A and 2B to move the receiving bucket to the elevated discharge position 261 shown in FIGS. 3C, 3D and 3E. A reversal of this operation causes the receiving bucket again to return to the horizontal receiving position

260. Conversely, extension of the hydraulic cylinder rods 364 from their respective hydraulic cylinders 363 causes the lever arms 365 to be pivoted in counterclockwise directions as viewed in FIGS. 2A and 2B so as to move the sweeping wall 284 from the lowered position shown in FIG. 3A to the raised position shown in full lines in FIG. 3B. A reversal of this operation, of course, causes the sweeping wall again to be returned to the lowered position shown in FIG. 3A.

The vehicle 20 mounts a container lifting assembly 380 which is, in all respects, conventional and, accordingly, will be described only briefly herewithin. The container lifting assembly has a main frame 381 mounted on the main frame 51 of the truck 50 and including an upper support arm 382 which extends obliquely downwardly from the upper portion of the main frame. A pivot assembly 383 is mounted on the terminal end of the upper support arm. A pair of upper support plates 384 are mounted on the upper support arm and the main frame. A pivot assembly 385 is mounted on and interconnects the upper support plates 384. Linking arms 390 are pivotally mounted on, and depend from, the pivot assembly 385. A pivot assembly 391 is mounted on the terminal end portions of the linking arms 390. An hydraulic cylinder mount 392 is mounted on the main frame 381. An hydraulic cylinder 393 is pivotally mounted on a hydraulic cylinder mount and, in turn, mounts an hydraulic cylinder rod 394 extendable from and retractable within the hydraulic cylinder. The hydraulic cylinder rod mounts a pivot assembly 395 at the terminal end portion thereof as best shown in FIG. 2B.

A secondary or pivot frame 400 has a pivot arm 401 which is mounted for pivotal movement on the pivot assembly 391 between the lowered position shown in FIG. 2A and the raised position shown in 2B. The pivot arm has a sloped portion 402 on which is mounted a grasping assembly 403. The grasping assembly includes a pair of jaws 404 which are movable to and from the grasping position shown in FIGS. 1, 2A, 2B and 4. The jaws are movable between these positions by gear segments 405 under the impetus of hydraulic cylinder assembly 406 extending between one of the gear segments and the pivot frame 400. Thus, as can best be visualized upon reference to FIG. 2A, contraction of the hydraulic cylinder assembly 406 causes the jaws to be moved toward each other to the position shown in FIG. 2A and, conversely, extension of the hydraulic cylinder assembly 406 causes the jaws to be moved from each other and thus from a grasping position.

A pivot arm 420 is mounted on the pivot assembly 383 for pivotal movement thereon. An hydraulic cylinder rod 421 extends from an hydraulic cylinder, not shown, and is mounted on the pivot arm 420 by a hydraulic cylinder rod mount 422 in spaced relation to the pivot assembly 383. A linking pin 423 interconnects the pivot arm 420 and the pivot frame 400. Since this structure is conventional, it need only be understood that the pivot arm 420 is operable to move the container lifting assembly 380 from a retracted position, not shown, for normal earth traversing movement to the extended positions shown in FIGS. 2A and 2B for purposes of grasping and lifting the container 21, as will hereinafter be described.

Container

The container 21 of the apparatus 10 of the present invention has a container housing 520. The container is preferably, although not necessarily, constructed of a durable molded plastic material resistant to ultraviolet light. The container housing has a bottom wall 521 with a lower surface 522 having parallel channels 523 therein. The container housing has a side wall 524 with a flared upper portion 525 thereby forming an annular, downwardly facing shoulder 526. The container housing can be viewed as having a rear portion 527 and a front portion 528, as best shown in FIG. 5.

The side wall 524 of the container housing 520 has recesses therein, hereinafter referred to as wheel recesses 535 at the rear portion 527 thereof. Wheel assemblies 536 are individually mounted on an axle which extends through the side wall 524. The wheel assemblies are thus individually mounted for rotational movement on the axle within the wheel recesses. On the rear portion of the side wall above the annular shoulder 526 are rearwardly extended handle mounts 537 interconnected by a handle bar 538.

Figure 6:
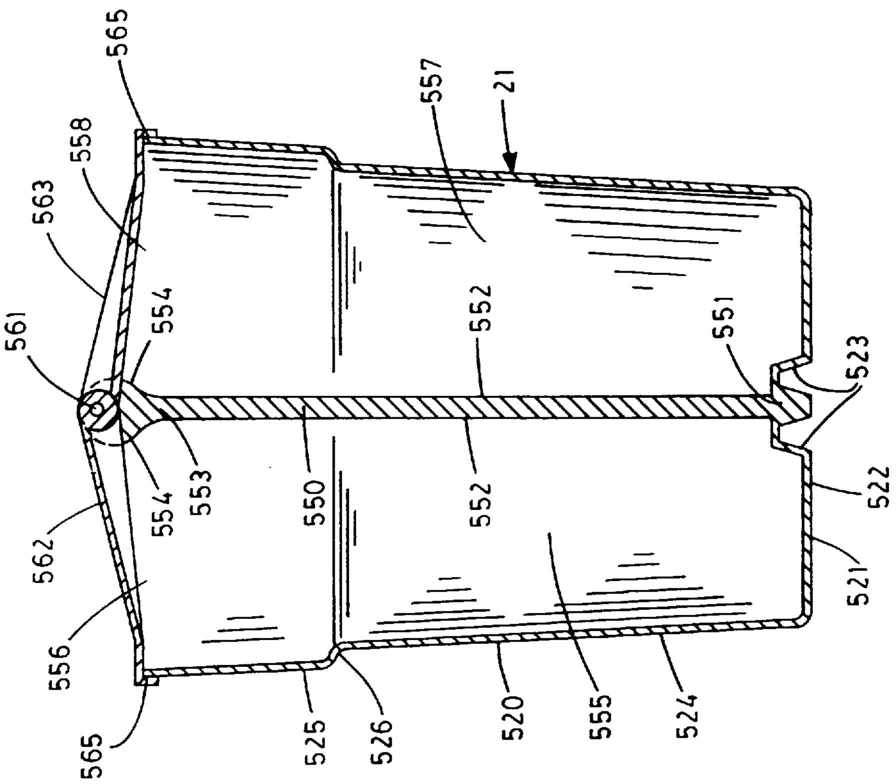
FIG. 6 is a somewhat enlarged, vertical section taken on line 6—6 in FIG. 2A.

Referring more particularly to FIG. 6, the container housing 520 has a dividing wall 550 extending from a base portion 551 between the channels 523 downwardly for ground engagement. The dividing wall has opposite side surfaces 552 and extends to an upper portion 553 dividing the interior of the container housing substantially into compartments of equal size. The upper portion 553 of the dividing wall has curved surfaces 554 curving from each other in an upward direction. As shown in FIG. 6, the dividing wall divides the interior of the container housing into a left or first compartment 555 which communicates with the exterior of the container housing through a mouth 556 and a right or second compartment 557 which communicates with the exterior through a mouth 558.

Figure 5:
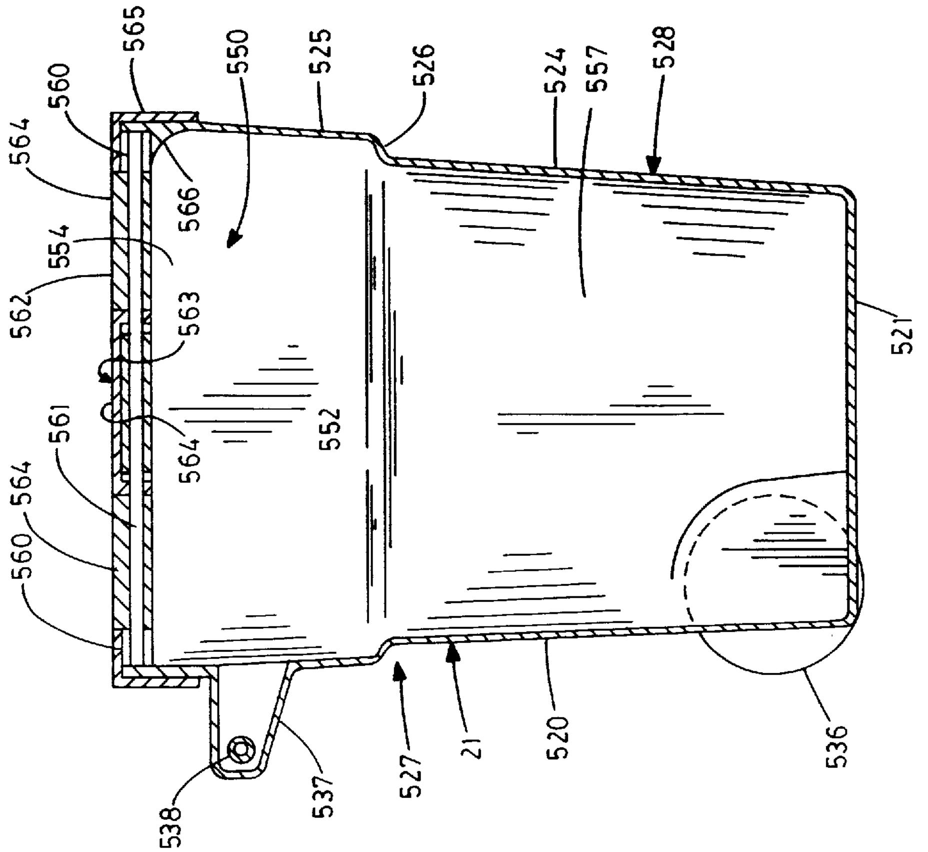
FIG. 5 is a somewhat enlarged vertical section taken on line 5—5 in FIG. 2A.

Referring more particularly to FIG. 5, a pair of shaft mounts 560 are individually mounted on the upper portion 553 of the dividing wall 550. The shaft mounts individually mount a shaft 561 extending therebetween. Referring more particularly to FIG. 6, oppositely extending left and right lids 562 and 563, respectively, are pivotally mounted on the shaft for movement upwardly and toward each other from the closed positions shown in FIG. 6. The left and right lids have pivot sleeves 564 which are pivotally received about the shaft to so mount the left and right lids. The pivot sleeves of the left and right lids are offset relative to each other as shown in FIG. 2A and FIG. 5 to permit them to pivot to standing positions which are substantially back to back relative to each other. The side wall 524 of the container housing at the front portion 528 thereof immediately adjacent to the shaft 561 has curved surfaces 566 on opposite sides of the dividing wall 550 and curving, as shown in FIG. 5, generally toward the rear portion 527 of the container housing.

As shown in FIG. 1, the container lifting assembly 380 is adapted to grasp the container 21 in such a manner, as will hereinafter be described in greater detail, aligning the dividing wall 550 thereof with the upper edge 245 of the front wall 244 of the receiving bucket 241. Axis of alignment 580 shown in FIG. 1 is intended to illustrate such alignment.

Operation

The operation of the described embodiment of the subject invention is believed to be clearly apparent and is briefly summarized at this point.

Referring first to the operation of the container 21, one such container is issued to each residence, business or other site which produces material to be collected. Depending upon the recycling program being operated by the municipality or other operating entity running the program, the left and right lids 562 and 563 are typically labeled with indicia indicating the type of material to be deposited in each compartment of the container. When the vehicle 20 is arranged in the configuration of the embodiment herein described, the left lid 562 shown in FIG. 6 is labeled with indicia indicating recyclables and the right lid 563 is labeled with indicia indicating waste material. If the vehicle is constructed in a different configuration than heretofore described, the labeling for the two lids may be reversed. In any case, the recyclables are to go in the receiving bucket 241 and the waste material in the remaining area of the receiving opening 120. Furthermore, the indicia on the left and right lids may be itemized if desired so as to provide further guidance to the user. For example, the indicia on the left lid for recyclables may itemize the specific recyclables to be deposited or, alternatively, may recite recyclables which are not to be deposited in the first compartment 555 beneath the left lid. Similarly, the right lid may bear indicia specifying the specific types of waste materials to be received and/or listing the waste materials not to be deposited within the second compartment 557 beneath the right lid.

The user of the specific container 21 deposits the designated materials in the appropriate first compartment 555 or second compartment 557 of the container during a period of usage, such as several days. On the day specified by the municipality for collecting the waste material and recyclables, the user simply transports the container on the wheel assemblies 536 using the handle bar 538 to the street and places the wheel assemblies in engagement with the curb bordering the street with the handle bar facing away from the street. Such positioning of the container automatically orients the container relative to the axis of alignment 580 previously referred to and shown in FIG. 1. More specifically, the container, once so positioned, defines the axis of alignment 580 which is coextensive with the dividing wall 550 of the container, as previously described.

The vehicle 20 assigned to the specific collection area in which the container 21 is present, is driven to each site in turn. During such operation of the vehicle, the container lifting assembly 380 is retracted so that it does not extend laterally of the vehicle sufficiently to interfere with normal operation of the vehicle. The vehicle operator drives the vehicle to the site of the container moving to the position relative to the container and to the axis of alignment 580 as shown in FIG. 1. As can therein be visualized, the positioning of the vehicle relative to the axis of alignment 580 defined by the container automatically orients the container and the compartments thereof relative to the upper edge 245 of the front wall 244 of the receiving bucket 241. No further adjustment is required by the operator of the vehicle. Thereafter, the operator operates the hydraulic control system 300 from the driver's compartment 71 to cause the hydraulic cylinder rod 421 of the hydraulic cylinder, not shown, to move the pivot arm 420 outwardly to the position shown in FIGS. 2A and 2B. Through the linking pin 423, this moves the pivot frame 400 outwardly to the position shown in FIG. 2A. At this time, the jaws 404 of the grasping assembly 403 are disposed in opened or spread relation so that the jaws 404 pass on opposite sides of the container 21 beneath the annular shoulder 526. Thereafter, the hydraulic cylinder assembly 406 is operated to move the gear segments 405 to close the jaws 404 to grasp the container as shown in FIG. 2A.

Subsequently, the operator operates the hydraulic control system 300 to expand the hydraulic cylinder 393 to move the hydraulic cylinder rod 394 thereof outwardly and thereby pivot the pivot arm 401 about the pivot assembly 391. Such movement is continued until the container reaches the inverted discharge position shown in FIG. 2B and in FIG. 4. As can be seen in those views, the left and right lids 562 and 563, respectively, are gravitationally moved to the opened positions shown in those views. As can best be seen in FIG. 2B, this means that the left lid 562 is within the receptacle 252 of the receiving bucket 241 and the right lid 563 is on the opposite side of the front wall 244 of the receiving bucket. As a consequence, the waste material in the second compartment 557 falls into the receiving opening 120 to the right of the receiving bucket and the recyclables fall from the first compartment 555 of the container into the receptacle 252 of the receiving bucket. By a reversal of the foregoing steps, the operator returns the container 21 to the curb side position previously described, releases the jaws 404 of the grasping assembly 403 from the container and withdraws the container lifting assembly 380 to the retracted position for normal transport.

Thereafter, either during movement to the next location or while in a stationary position, the operator, using the hydraulic control system 300, may decide to move the recyclables from the receiving bucket 241 into the recyclable compartment 181 and the waste material from the receiving box 110 into the waste material compartment 180. Depending upon the specific capacities of the receiving bucket and the receiving compartment 119, as well as the quantity of these materials collected at one or more successive sites, it may not be necessary to move the recyclables and waste material into their respective recyclable compartment 181 and waste material compartment 180 until several sites have been accessed.

In any case, once it is determined by the operator to transfer the recyclables from the receiving bucket 241 and the waste material from the receiving compartment 119, the following of sequence of steps is performed by the apparatus 10 of the present invention. These steps may be most clearly visualized upon reference to FIGS. 3A through 3E. Thus, FIG. 3A depicts the relative positions of the operative components of the main housing 100 at the time this operation is to begin. It should be visualized that the receiving bucket 241 contains a quantity of recyclables and the receiving compartment 119 contains a quantity of waste material. Similarly, the rear door assembly 210 and the interior rear door assembly 230 are in the positions shown in FIG. 3A at this time. The operator first operates the hydraulic control system 300 to operate the sweeping control assembly 361. Thus, as previously described, the hydraulic cylinder 363 is operated to move the sweeping wall 284 from the position shown in full lines in FIGS. 2A and 3A to the position shown in FIG. 3B in full lines. This movement, in effect, opens the recyclable compartment 181 for the receipt of the recyclables. Subsequently, the operator operates the receiving bucket hydraulic control assembly 341, as previously described, to move the receiving bucket 241 from the position shown in full lines in FIGS. 3A and 3B, to the elevated discharge position 261 shown in FIGS. 3C through 3E.

Simultaneously, the waste feeding assembly 190 is operated to move the compression head 194 from the retracted position shown in FIGS. 3A and 3B along the tract portion 193 of the central housing 191. Since the receiving bucket 241 is now in the position shown in FIG. 3C, the compression head 194 is free to travel the full length of the tract portion previously described. Thus, the waste material ahead of the compression head is moved to the left, as viewed in FIGS. 3A through 3E, and into the waste material compartment 180. During this movement, the deflection plate 203 of the receiving box deflecting assembly 200 operates to prevent any recyclables or other material from failing from the receiving bucket 241 behind the compression head, or in other words, between the compression head and the front wall 111 of the receiving box 110. Movement of the compression head is continued until all of the waste material in front of the compression head is moved into the waste material compartment 180. Subsequently, the compression head is again returned to the retracted position shown in FIGS. 3A and 3B.

Simultaneously with this operation, or thereafter as preferred by the operator or the preprogrammed operation of the hydraulic control system 300, the sweeping control assembly 361 is again operated to move the sweeping wall 284 in a clockwise direction as best visualized in FIG. 3D from the position shown in phantom lines therein to the position shown in full lines. This operation carries the sweeping wall and the terminal edge 285 thereof along the sloped floor 242 of the receiving bucket so as to push all of the recyclables within the receiving bucket along the sloped floor and into the recyclable compartment 181. The discharge chute 251 of the receiving bucket operates to guide the recyclables into the mouth of the recyclable compartment 181. Thereafter, the receiving bucket hydraulic control assembly 241 is again operated to return the receiving bucket to the lower receiving position 260. Accordingly, after this series of steps is completed, the apparatus is again returned to the arrangement shown in FIG. 3A ready for receipt of waste materials and recyclables at the next site.

This process is repeated until the vehicle 20 has completed its route or the waste material compartment 180 and/or the recyclable compartment 181 have been filled to capacity. The vehicle operator then drives the vehicle to the site designated for discharge of the contents of the waste material compartment and the recyclable compartment. Frequently, municipalities employ different locations for the discharge of waste material and recyclables, or use several sites at which the materials must be discharged. In any case, it is virtually always necessary to discharge the waste material at a different time than the recyclables. This is accomplished in the apparatus of the present invention by affording the provision for separate discharge of the waste material from the waste material compartment and the recyclables from the recyclable compartment.

Visualizing the operative components of the vehicle as shown in FIG. 3A, it will be seen that the recyclables collected in the recyclable compartment 181 can fill, not only the recyclable compartment, but also the area between the rear door assembly 210 and the interior rear door assembly 230. With this in mind, it is desirable to discharge the recyclables first. Accordingly, the operator drives the vehicle to the place designated for discharge of the recyclables. The hydraulic control system 300 is then operated to move the rear door assembly 210 to the raised position previously described. Using a conventional subsystem, not shown, the main housing is then elevated at the forward portion thereof to incline the main housing at the forward portion thereof and thereby gravitationally discharging the recyclables from the recyclable compartment 181 at the discharge site. The recyclables are simply discharged gravitationally and no further action is required to remove the recyclables. Any conventional mechanism can be employed to assist in removal should the recyclables become lodged in position. Thereafter, the rear door assembly 210 is then again returned to the closed and sealed position shown in FIG. 3A.

The vehicle is then driven by the operator to the discharge site designated for waste materials. Using the hydraulic control system 300, the operator operates the interior rear door hydraulic assembly to move the interior rear door assembly 230 from the closed position shown in FIGS. 3A through 3D to the opened position shown in FIG. 3E. Since, as previously described, the interior rear door assembly 230 nests within the rear door assembly 210, the upper recyclable compartment is sealed to prevent release of any recyclables which may have been trapped within the recyclable compartment. While this is not known to occur, it does offer an additional safeguard to ensure that the materials are discharged only at the designated locations. Subsequently, the operator again operates the hydraulic control system 300 to move the rear door assembly 210 to the elevated position, not shown, to expose the interior of the waste material compartment 180 as can best be visualized upon reference to FIG. 3E. Thereafter, the operator again inclines the main housing 100 so as gravitationally to discharge the waste material from the waste material compartment 180 at the designated site. Should the waste material be lodged in position, the conventional mechanism can be employed to assist in removal, or the waste feeding assembly 190 can be employed for this purpose. Subsequently, the interior rear door assembly is again returned to the closed position shown in FIGS. 3A through 3D and the rear door assembly 210 is again returned to the closed position shown in FIGS. 3A through 3E. The vehicle is now again ready to pick up waste materials and recyclables.

Therefore, the method and apparatus for receiving material of the present invention permit natural resources to be conserved in a manner which is entirely practical; which are of universal application permitting them to be employed by the smallest, as well as the largest, municipalities; which are fully compatible with all conventional systems and standards of operation; which are inexpensive to operate and require little instruction; which can be employed in conventional equipment by retrofitting such equipment with the operative components of the subject invention; and which are otherwise entirely effective in achieving their operational objectives.

Although the invention has been herein shown and described in what is conceived to be the most practical and preferred embodiment, it is recognized that departures may be made therefrom within the scope of the invention which is not to be limited to the illustrative details disclosed.

While the preferred embodiment of the invention has been illustrated and described, it will be appreciated that various changes can be made therein without departing from the spirit and scope of the invention.

Having described our invention, what we claim as new and desire to secure by letters patent is:

1. A container for receiving material composed of first components and second components, the container comprising a housing having an interior; and a wall extending through the interior of the housing to divide the interior into a first compartment, for said first components, and a second compartment, for said second components, communicating with the exterior of the container through individual discharge openings; at least one lid pivotally connected to said wall to cover at least one of said discharge openings; said wall including a pair of oppositely directed divergent surfaces adjacent said discharge openings individually directing the first components from the first compartment and the second components from the second compartment along substantially discrete paths when the container is inverted.

2. The container of claim 1 wherein said divergent surfaces of said wall curve away from each other to urge the first components and second components from each other along said substantially discrete paths.

3. The container of claim 1 in which said housing has surfaces adjoining the discharge openings on opposite sides of said wall over which the first components and second components move along said substantially discrete paths when the container is inverted and said surfaces of the housing are curved so as to direct movement along said paths.

4. The container of claim 1 including closures mounted on the housing, each closure mounted for individual movement between a closed position in individual covering relation to said discharge openings, an open position exposing said discharge openings when the container is inverted.

5. A container, comprising:

an upstanding peripheral sidewall and a bottom wall defining a refuse collection chamber;

an upstanding dividing wall disposed in the collection chamber; said dividing wall dividing the collection chamber into first and second compartments; each of said compartments having an open upper end portion;

said dividing wall having an upper portion with a pair of oppositely directed divergent surfaces; a generally tubular shaft mount mounted on the upper portion of said dividing wall;

a shaft mounted in said shaft mount;

first and second lids for covering said open upper end portions of said first and second compartments, respectively, when said container is upright;

each of said lids having pivot sleeves which are pivotally received about the shaft to pivotally mount each lid on said shaft;

said pivot sleeves on said first lid being offset from said pivot sleeves on said second lid when said lids are mounted on said shaft to permit pivoting from a closed position to a standing position substantially back to back one to the other in which egress of material from said compartments is facilitated.

6. A container as claimed in claim 5, wherein said dividing wall has oppositely facing surfaces, one of said surfaces facing said first compartment and the other of said surfaces facing said second compartment; and wherein said oppositely facing surfaces diverge from one another at the upper portion of said dividing wall.

7. A container as claimed in claim 6, wherein said diverging surfaces at the upper end of said dividing wall form a thickened upper end portion which is thicker than the corresponding thickness of said pivot sleeves.

8. A container, comprising:

an upstanding peripheral sidewall and a bottom wall defining a refuse collection chamber;

an upstanding dividing wall disposed in the collection chamber; said dividing wall dividing the collection chamber into first and second compartments; each of said compartments having an open upper end portion;

said dividing wall having an upper portion; a generally tubular shaft mount mounted on the upper portion of said dividing wall;

a shaft mounted in said shaft mount;

first and second lids for covering said open upper end portions of said first and second compartments, respectively, when said container is upright;

each of said lids having pivot sleeves which are pivotally received about the shaft to pivotally mount each lid on said shaft;

said pivot sleeves on said first lid being offset from said pivot sleeves on said second lid when said lids are mounted on said shaft to permit pivoting of said lids from a closed position to an open position in which egress of material from said compartments is facilitated, a wheel axle connected to said bottom portion of said peripheral sidewall;

a wheel mounted for rotation on said wheel axle;

said wheel axle having a longitudinal axis substantially orthogonal to said dividing wall.

9. A container as claimed in claim 8, wherein said dividing wall has oppositely facing surfaces, one of said surfaces facing said first compartment and the other of said surfaces facing said second compartment; and wherein said oppositely facing surfaces diverge from one another at the upper portion of said dividing wall.

10. A container as claimed in claim 9, wherein said diverging surfaces at the upper end of said dividing wall form a thickened upper end portion which is thicker than the corresponding thickness of said pivot sleeves.

11. A container, comprising:

an upstanding peripheral sidewall and a bottom wall defining a refuse collection chamber;

an upstanding dividing wall disposed in the collection chamber; said dividing wall dividing the collection chamber into first and second compartments; each of said compartments having an open upper end portion;

first and second lids for covering said open upper end portions of said first and second compartments, respectively, when said container is upright;

a pivot pivotally mounting each of said lids to said wall to cover the open end portions of said first and second compartments, respectively;

and a pair of divergent surfaces on said wall adjacent said open upper end portion for directing material collected in each of said first and second compartments along substantially discrete paths when said container is inverted.

12. A container, comprising:

an upstanding peripheral sidewall and a bottom wall defining a refuse collection chamber;

an upstanding dividing wall disposed in the collection chamber; said dividing wall dividing the collection chamber into first and second compartments; each of said compartments having an open upper end portion;

said dividing wall having an upper portion; a generally tubular shaft mount mounted on the upper portion of said dividing wall;

a shaft mounted in said shaft mount;

first and second lids for covering said open upper end portions of said first and second compartments, respectively, when said container is upright;

each of said lids having pivot sleeves which are pivotally received about the shaft to pivotally mount each lid of said shaft;

said pivot sleeves on said first lid being offset from said pivot sleeves on said second lid when said lids are mounted on said shaft; to permit pivoting to a standing position substantially back to back onto the other, said upstanding peripheral sidewall having an upper exterior surface and a lower exterior surface; the periphery of said upper exterior surface being larger than the periphery of said lower exterior surface, thereby defining a shoulder portion between said upper and lower exterior surfaces;

means defining a wheel recess in the lower portion of said peripheral sidewall adjacent said bottom wall;

a wheel axle connected to said bottom portion of said peripheral sidewall;

a wheel disposed and in said wheel recess, said wheel being mounted for rotation on said wheel axis;

said wheel axle having a longitudinal axis substantially orthogonal to said dividing wall.

13. A container comprising an upstanding peripheral side wall and a bottom wall defining a refuse collection chamber, a wheel assembly disposed adjacent said bottom wall and including a pair of wheels spaced along and rotatable about an axis of rotation, a divider located in said chamber to extend orthogonal to said axis of rotation and subdivide said chamber into first and second compartments, each communicating with the exterior of the container through individual discharge openings, said divider including a pair of oppositely directed divergent surfaces, a pair of covers, each associated with a respective one of said compartments and each extending from said divider to a portion of said peripheral sidewall, and a hinge assembly connecting said covers to an upper edge of said divider to permit said covers to move from a closed position in abutment with said wall to an open position in which ingress and egress of material in aid compartments is facilitated.

14. A container according to claim 13 wherein each of said covers has an edge positioned adjacent said divider and arms projecting from said edge, said arms being offset from one another in the direction of said edge to permit overlapping thereof and being pivotally connected to said divider along a common axis.

15. A container according to claim 14 wherein said divider has a pair of oppositely directed faces that diverge adjacent said upper edge.

16. A container according to claim 15 wherein said opposite faces are connected by an upwardly directed surface and said arms extend across said upwardly directed surface.

17. A container according to claim 16 wherein a boss projects upwardly from said upwardly directed surface and a pin extends between said boss and said arms to provide said hinge.

18. A container according to claim 15 wherein said oppositely directed faces terminate in curved portions at said upper edge.

19. A container according to claim 18 wherein said curved portions are outwardly convex.

20. A container according to claim 16 wherein said edge of each of said covers is juxtaposed with said upwardly directed surface on said divider when said cover is in said closed position.

21. A container according to claim 13 wherein each of said wheels is located in a recess formed in said side wall adjacent said bottom wall.

22. A container according to claim 21 wherein said side wall flares outwardly to provide a downwardly directed shoulder intermediate opposite ends of said side wall.

23. A container comprising an upstanding peripheral sidewall and a bottom wall defining a refuse collection chamber, a divider disposed in said chamber to divide said container into a pair of compartments each communicating with the exterior of the container through individual discharge openings, said divider having a pair of oppositely directed faces diverging adjacent an upper edge thereof to provide a deflector for material as it is discharged from said container, and a pair of covers, each associated with a respective one of said compartments and each extending from said divider to a portion of an upper edge of said peripheral wall when in a closed position, said covers being pivotally connected to said divider to be movable to an open position.

24. A container according to claim 23 wherein a wheel assembly is connected to said side wall, said wheel assembly including a pair of wheels spaced apart along an axis of rotation orthogonal to said divider.

25. A container according to claim 24 wherein each of said wheels is located in a recess formed in said side wall.

26. A container comprising an upstanding peripheral sidewall and a bottom wall defining a refuse collection chamber, a wheel assembly disposed adjacent said bottom wall and including a pair of wheels spaced apart along and rotatable about an axis of rotation, a divider located in said chamber to subdivide said chamber into first and second compartments, each communicating with the exterior of the container through individual discharge openings, a pair of covers, each associated with a respective one of said compartments and each extending from said divider to said peripheral wall, a hinge assembly connecting respective edges of said covers to an upper edge of said divider to permit said dividers to move from a closed position in abutment with said wall to an open position in which ingress and egresss of material in said compartments is facilitated, said divider including a pair of divergent surfaces adjacent said upper edge to provide a surface extending laterally to either side of said divider to underlie each of said edges of said covers.

27. A container according to claim 26 wherein said hinge assembly includes a plurality of pivot sleeves extending from said edges of said covers and offset relative to one another in the plane of said divider.

28. A container according to claim 27 wherein a shaft extends between said pivot sleeves and is supported on said divider to define a hinge axis.

29. A container according to claim 28 wherein said covers include a generally planar portion and said pivot sleeves project above said planar portion, said pivot sleeves being offset relative to one another to permit pivoting to a standing position substantially back to back one to the other.

30. A container according to claim 29 wherein said divider is disposed orthogonally to said axis of rotation.

31. A container according to claim 30 wherein a handle is disposed on said peripheral wall parallel to said axis of rotation.

32. A container comprising an upstanding peripheral sidewall and a bottom wall defining a refuse collection chamber, a wheel assembly disposed adjacent said bottom wall and including a pair of wheels spaced apart along and rotatable about an axis of rotation, a divider located in said chamber to subdivide said chamber into first and second compartments, each communicating with the exterior of the container through individual discharge openings, a pair of covers, each associated with a respective one of said compartments and each extending from said divider to said peripheral wall, said wall including a pair of oppositely directed divergent surfaces adjacent an upper edge of said divider, a hinge assembly connecting respective edges of said covers to said upper edge of said divider to permit said covers to move from a closed position in abutment with said wall to an open position in which ingress and egress of material in said compartments is facilitated, said hinge assembly including a plurality of pivot sleeves extending from said edges of said covers and offset relative to one another in the plane of said divider, a shaft extending between said pivot sleeves and supported on said divider to define a hinge axis, said covers including a generally planar portion with said pivot sleeves projecting above said planar portion to permit pivoting to a standing position substantially back to back one to the other.

33. A container comprising an upstanding peripheral sidewall and a bottom wall defining a refuse collection chamber, a wheel assembly disposed adjacent said bottom wall and including a pair of wheels spaced apart along and rotatable about an axis of rotation, a divider located in said chamber to subdivide said chamber into first and second compartments, each communicating with the exterior of the container through individual discharge openings said divider including a pair of oppositely directed divergent surfaces; a pair of covers, each associated with a respective one of said compartments and each extending from said divider to said peripheral wall, a hinge assembly connecting respective edges of said covers to an upper edge of said divider to permit said dividers to move from a closed position in abutment with said wall to an open position in which ingress and egress of material in said compartments is facilitated, said container progressively increasing in cross sectional area from said bottom wall toward said covers.

34. A container according to claim 33 wherein said peripheral wall includes a shoulder intermediate said bottom wall and said covers to increase the cross sectional area toward said covers.

35. A container according to claim 34 wherein a handle is provided on said peripheral wall above said shoulder and parallel to said axis of rotation.

36. A container according to claim 9 wherein said pivot sleeves are configured to permit said covers to move in said open position to a standing position substantially back to back on the other.

* * * * *